(Model.)
P. ASHEN.
WIRE HOOK.
No. 396,847. Patented Jan. 29, 1889.
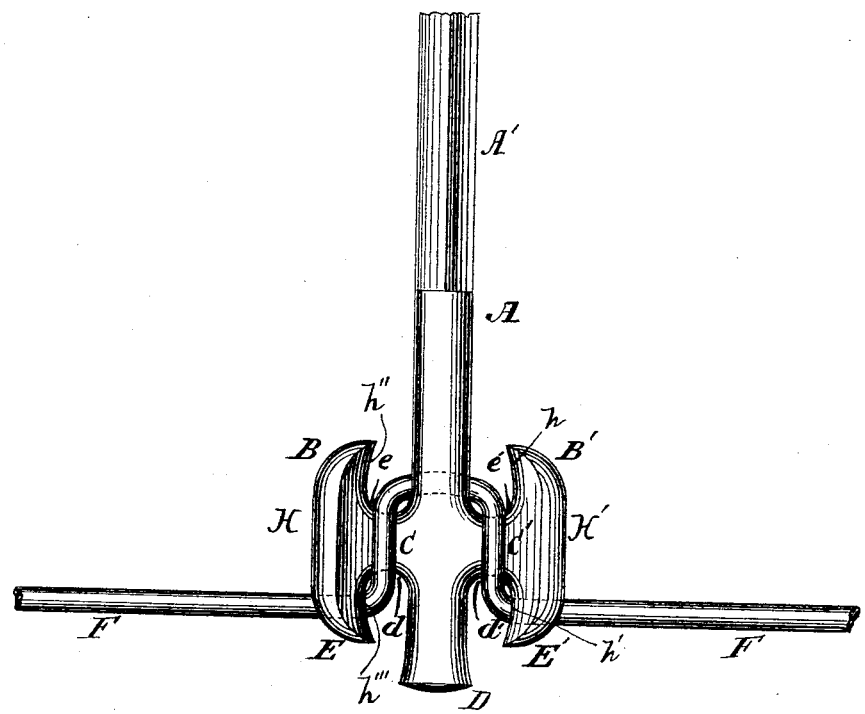
Witnesses:
Edward Wolff
Inventor:
Peter Ashen United States Patent Office.

PETER ASHEN, OF NEW YORK, N. Y., ASSIGNOR TO SYLVESTER Y. L'HOMMEDIEU & CO., OF SAME PLACE.

WIRE HOOK.

SPECIFICATION forming part of Letters Patent No. 396,847, dated January 29, 1889.

Application filed September 13, 1888. Serial No. 285,264. (Model.)

*To all whom it may concern:*

Be it known that I, PETER ASHEN, a citizen of the United States, residing at New York city, New York, have invented certain new and useful Improvements in Wire Hooks; and I do declare the following to be a full, clear, and exact description of the invention, such as will enable others skilled in the art to which it appertains to make and use the same, reference being had to the accompanying drawings, and to the letters and figures marked thereon, which form part of this specification.

My invention relates to that class of insulated hooks upon which are designed to be hung electric lines or wires. Its novelty consists in its peculiar form and adaptation to the uses for which it is employed.

It consists, essentially, of two arms arranged parallel to a main stem by means of a cross-bar on each side of which they project.

In the drawing, A is the stem or shank of the hook.

C C' is a cross-bar, at the outer ends of which are attached the two arms H H', each of which has the spur or claw B B' pointing upward, and the similar spur or claw, E E', pointing downward or in the opposite direction, each arm being generally parallel in direction with the stem or shank A and its extension D. The stem or shank is insulated by means of a base, A', of non-conducting material. In the recesses of the duplex hooks $e$, $e'$, $d$, and $d'$ a line or wire, as F, can be readily adjusted in any direction in which it may be required to hold it secure. To aid this effect, I prefer to taper the stem-extension D upward toward the cross-bar C C', and to make the arms H and H' slightly concave at $h''$, $h'''$, $h$, and $h'$.

My invention has advantages which are obvious upon slight inspection. The hooks heretofore most usually employed consisted, essentially, of a shank, as A, a cross-bar, as C C', and the two spurs B B', pointing upward or toward the base of the hook. In the use of that device a wire was only securely held when its general direction was parallel with the cross-bar C C' and when it was passed in front of the stem A and behind each of the spurs B B', or back of the stem A and in front of each of the spurs B B'. If the wire were hooked on in any other way, or if a marked change in the direction of the wire were required after passing the hook, it was insecurely held and liable to slip, and the operator usually twisted the wire around the hook, using a surplus of wire. As, too, in such cases only one hand is usually free to operate with, it took up much time to suspend the wire in this manner.

My improvement consists in the addition of the spurs or claws E E' and the extension D of the stem or shank A. By its use a wire can be abruptly changed in direction upon each side of the hook. It always gives a bearing-surface against three points not in the same straight line. It enables the operator to firmly secure the wire by the use of less wire, and it takes much less time and labor to string the wire. When insulated wires are used, two wires or more can be strung on the same hook—a thing quite impossible with the style of hook formerly employed. Having four recesses and as many spurs the modes of fastening may vary widely, and still the wire will be firmly and securely held.

What I claim as new is—

1. An insulated hook for supporting electric wires, consisting of two arms arranged parallel to a main stem by means of a cross-bar on each side of which they project.

2. In an insulated hook for supporting electric wires, the combination, with the stem A, of the spurs B B', pointing toward the base of the stem, the spurs E E', pointing in the opposite direction, and the cross-bar C C', substantially as described.

3. In an insulated hook for supporting electric wires, the combination, with the stem A, of the spurs B B', pointing toward its base, the spurs E E', pointing toward its extension D, the cross-bar C C', and the stem-extension D, as and for the purposes set forth.

In testimony whereof I affix my signature in presence of two witnesses.

PETER ASHEN.

Witnesses:
 WM. H. SHELDON,
 H. M. COLLYER.